United States Patent [19]
Barringer et al.

[11] Patent Number: 5,230,306
[45] Date of Patent: Jul. 27, 1993

[54] CERAMIC SOOTBLOWER ELEMENT

[75] Inventors: Eric A. Barringer, Lynchburg, Va.; Herbert Feinroth, Silver Springs, Md.; Donald L. Hindman, Forest, Va.; William G. Long, Lynchburg, Va.; Roy R. Ramey, Forest, Va.; Gregory Parkin, Lancaster, Ohio

[73] Assignee: The Babcock & Wilcox Company, New Orleans, La.

[21] Appl. No.: 736,063

[22] Filed: Jul. 25, 1991

[51] Int. Cl.⁵ .................................. F22B 37/48
[52] U.S. Cl. ........................ 122/383; 122/392; 122/390
[58] Field of Search ............... 122/383, 384, 390, 392, 122/405

[56] References Cited

U.S. PATENT DOCUMENTS

| | | | |
|---|---|---|---|
| 1,255,156 | 2/1918 | Goff | 122/383 |
| 1,416,553 | 5/1922 | Garland | 122/392 |
| 1,421,675 | 7/1922 | Colven et al. | 122/392 |
| 2,532,447 | 12/1950 | Handoll et al. | 122/392 |
| 4,813,384 | 3/1989 | Zalewski | 122/390 |
| 4,951,920 | 8/1990 | Tsuno | 251/368 |

FOREIGN PATENT DOCUMENTS 134507 11/1919 United Kingdom ............... 122/390

OTHER PUBLICATIONS

*Oxide Fiber–Oxide Matrix Composite System*, D. L. Hindman, Mar. 1987, pp. 3-1 through 3-8.
*Research and Development of a Ceramic Fiber Composite Heat Exchanger*, The Babcock & Wilcox Company, Sep. 1989, pp. 3-51 through 3-62.

Primary Examiner—A. Michael Chambers
Attorney, Agent, or Firm—Harness, Dickey & Pierce

[57] ABSTRACT

A ceramic element for a sootblower element is disclosed in which the element is manufactured by winding a ceramic fiber around a mandrel and subsequently densifying the composite using a sol-gel process. Separate elements are coupled together using a ceramic coupling member. Ceramic nozzle bodies are inserted into the elements. The sootblower tubes disclosed herein can withstand greater temperatures and more corrosive environments than currently used metallic lance tubes, thus enabling the sootblower element to be permanently installed within a boiler and eliminating the need for a retracting element type sootblower.

31 Claims, 3 Drawing Sheets

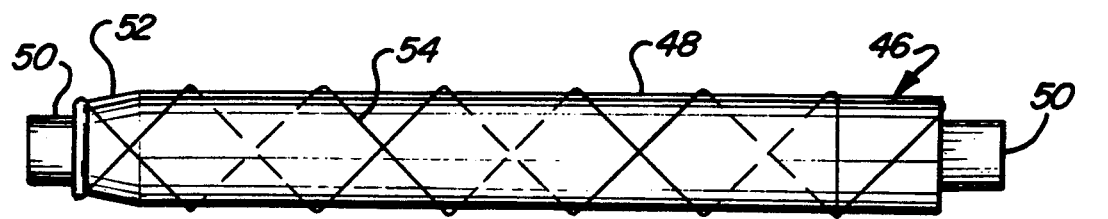
*Fig-2*
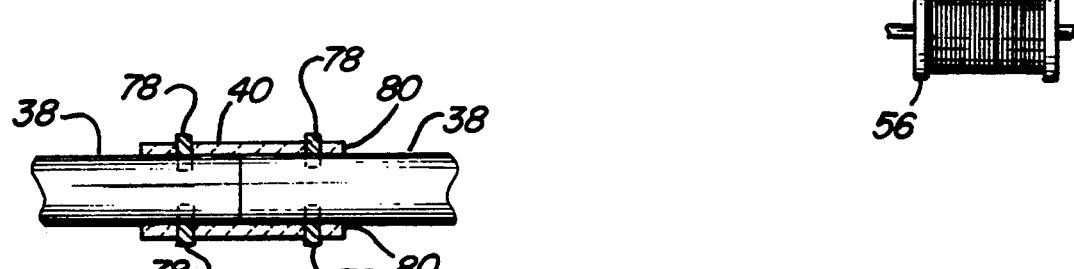
*Fig-3*
*Fig-4*
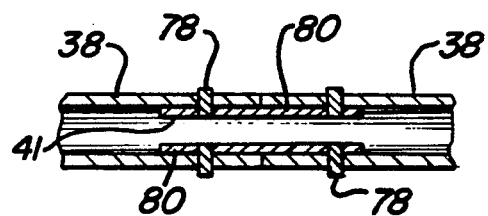
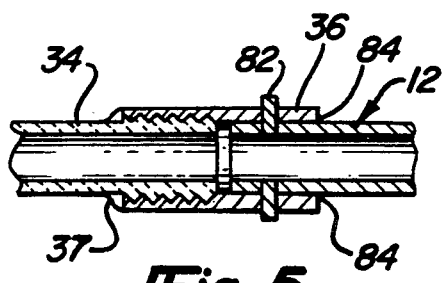
*Fig-5*

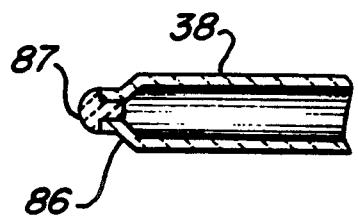
_Fig-6_
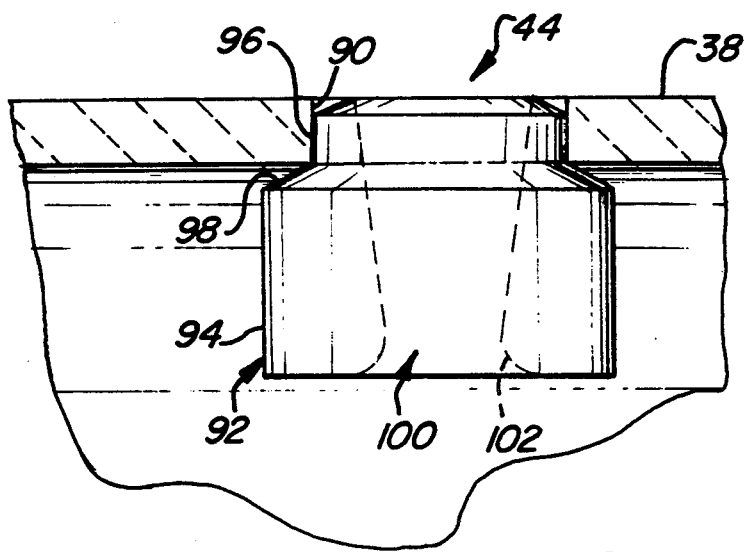
_Fig-7_
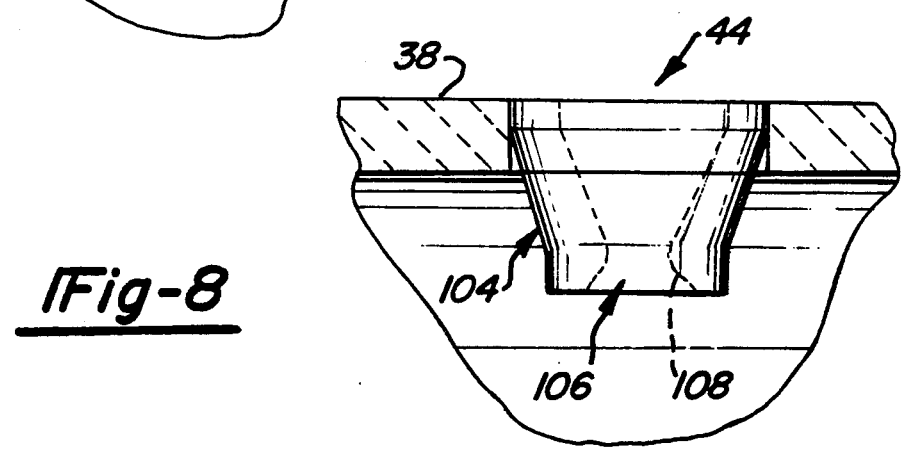
_Fig-8_
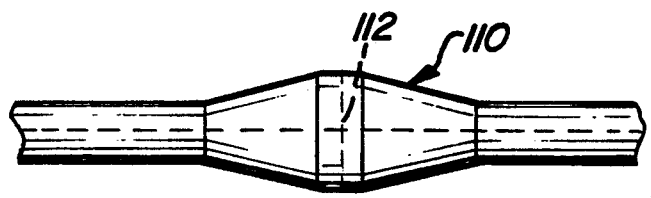
_Fig-9_

CERAMIC SOOTBLOWER ELEMENT

BACKGROUND AND SUMMARY OF THE INVENTION

This invention is related to an element for a sootblower and in particular to a ceramic composite element.

Sootblowers are used to project a stream of blowing medium such as water, air, or steam against heat transfer surfaces within large scale boilers, such as a recovery boiler, to remove slag and ash encrustations from the boiler surfaces. The blowing medium impact produces mechanical and thermal shock which causes adhering layers of these encrustations to be removed.

One general category of sootblowers is known as the long retracting type. These devices have a retractable lance tube which is periodically advanced into the boiler interior and simultaneously rotated such that one or more nozzles along the length of the lance tube project jets of the blowing medium against the boiler surfaces. The lance tube is withdrawn from the boiler upon completion of the blowing process.

A retracting type sootblower is used in applications where the internal temperature of the boiler and/or the corrosive environment within the boiler interior is such that a metallic manifold pipe, or element, cannot endure permanent installation within the boiler. A significant disadvantage with the long retracting type of sootblower is that it is necessary to provide a considerable clearance area surrounding the boiler for the lance tube and to provide a drive mechanism to insert the lance tube into the boiler. In lower temperature and less corrosive environments, a metallic element can be permanently positioned within the boiler and periodically activated to rotate and project jets of blowing medium against the boiler surfaces. However, the life of the metallic element is relatively short, requiring frequent replacement.

Accordingly, it is an object of the present invention to provide a sootblower element that can be permanently installed in a high temperature and highly corrosive environment that previously required a retractable type metallic lance tube.

It is a further objective to provide a permanently installed element with a longer life span than permanently installed metallic elements.

It is a feature of the present invention to provide an element of ceramic tubing that is resistant to the high temperature and corrosive environment found within a boiler, with the result that the element can be permanently installed within the boiler. This eliminates the need for a clearance area surrounding the boiler and eliminates the need for a lance tube drive mechanism. The ceramic element can also replace permanently installed metallic elements used in less corrosive environments to provide a element with a longer life.

Monolithic ceramics are inorganic, nonmetallic materials, consisting of oxides (e.g., alumina and zirconia) or nonoxides (e.g., silicon nitride and boron carbide). In the form of pottery and brick, monolithics have been known to man for thousands of years. With the advent of modern science, it has become possible to fabricate new types of ceramics and they have found application in numerous areas because of their high strength, and good resistance to abrasion, erosion, and corrosion. Despite these desirable characteristics, monolithics have one basic flaw, they fail catastrophically with minimum reliability. For example, a coffee mug shatters when it is dropped due to its brittle fracture structure. That is, a crack is able to propagate completely through the ceramic. Because they fail in brittle fracture, monolithic ceramics may not be suitable for sootblower elements.

Ceramics composites consist of a multiphase ceramic, where one phase represents a reinforcement consisting of particulates, whiskers, or fibers. Fibers can be continuous or discontinuous. Ceramic composites have been shown to have higher toughness and impact resistance, and greater strain to failure than monolithic materials. Other properties (strength, thermal stability, corrosion resistance) potentially rival monolithics. When a continuous fiber composite is highly stressed, cracks form in the matrix surrounding the fibers, however, the fibers themselves do not fracture. Hence, the fibers are able to divert and diffuse the cracks that do form, thus preventing complete failure until a much higher level of stress is reached. This phenomenon is known as nonbrittle fracture, and is an additional benefit of continuous fiber composites.

Desirable attributes of a ceramic composite for use as a sootblower element include: fiber structure that can be oriented to optimally resist anticiated loads; thermal shock resistance; ability to be bonded to other ceramics or metals; machinability; continuous fiber structure to impart nonbrittle failure; resistance to corrodents found within a boiler; abrasion resistance; and low permeability.

Thermal shock resistance is highly desirable due to the stresses induced by the blowing medium. The blowing medium will be hundreds of degrees cooler than the normal temperature of the sootblower element. Therefore, when the blowing medium is injected through the element, the interior surface of the element will be rapidly cooled which will create severe tensile stresses within the element wall.

The sootblower element of the present invention may be constructed from one or more tubular ceramic composite segments that are manufactured by filament winding a ceramic fiber around a cylindrical mandrel to create a porous, fibrous preform. Alternatively, the fiber preforms can be fabricated using a braided or weaving processes. Filament winding, braiding, or weaving are the preferred methods of preform manufacture as the ceramic fiber can be optimally oriented to resist anticipated loads. The preform is subsequently processed using a sol-gel technique to create a dense matrix within the preform. Coatings may be applied to the surface of the tube to enhance its corrosion resistance. One or more segments can be connected together utilizing a ceramic coupling member that is also manufactured using the same preform fabrication and sol-gel process.

Ceramic nozzles are inserted into the lance tube element to form the nozzles from which jets of the blowing medium are projected. The nozzles may be produced using traditional ceramic fabrication techniques, or they may consist of composites created using a preform fabrication and sol-gel process.

Further objects, features, and advantages of the invention will become apparent from a consideration of the following description and the appended claims when taken in conjunction with the accompanying drawings.

BRIEF DESCRIPTION OF THE DRAWINGS

FIG. 2 is a schematic view of the filament winding process used in manufacturing the element segments;

FIG. 3 is a partial sectional, partial elevational view of the coupling between adjacent segments;

FIG. 4 is a sectional view showing an alternative embodiment of the coupling between adjacent elements;

FIG. 5 is a cut away partial elevational view showing the attachment of the element to the sootblower;

FIG. 6 is a sectional view of the distal end of the element of the present invention;

FIG. 7 is a sectional view of the element showing a nozzle installation;

FIG. 8 is a sectional view similar to FIG. 7 showing an alternative embodiment of the nozzle installation; and FIG. 9 is an elevational view of the mandrel used for producing a filament wound nozzle body.

DETAILED DESCRIPTION OF THE INVENTION

Figure 1:
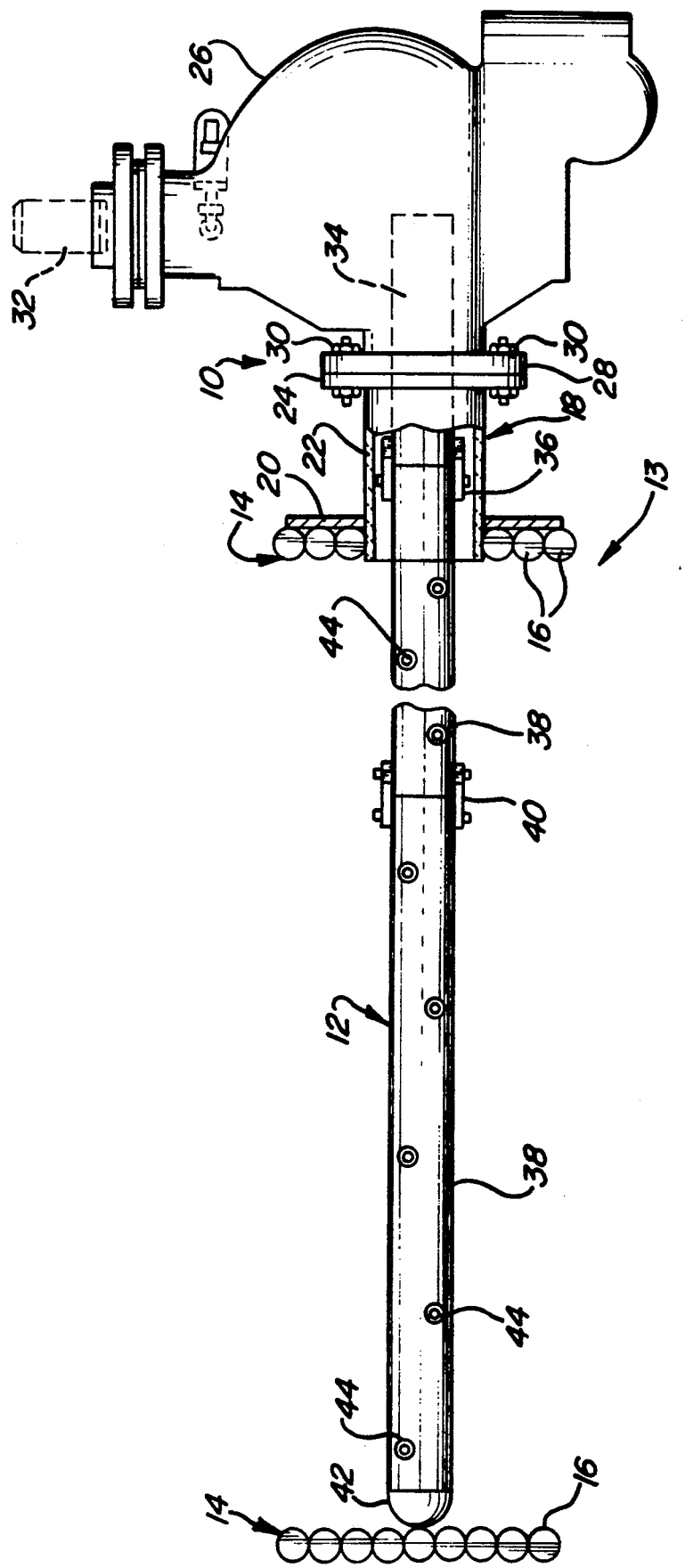
FIG. 1 is a schematic view showing a sootblower installed in a boiler having a ceramic element of the present invention.

A sootblower, designated generally at 10, in FIG. 1 contains a ceramic element 12 according to the present invention. Sootblower 10 is shown coupled to the wall 14 of a boiler 13. The boiler wall 14 is constructed of a plurality of tubes 16 through which a coolant is circulated to control the temperature of the boiler wall.

The sootblower is mounted by means of a wallbox 18 mounted to the boiler wall. Wallbox 18 comprises a mounting plate 20 coupled to the boiler wall, a pipe sleeve 22 and a flange 24. The blower head 26 of sootblower 10 is mounted to the flange 24 by plate 28 and nut and bolt assemblies 30. Steam or other blowing medium is supplied to the blower head 26 through a pipe 32. A swivel tube 34 extends from the blower head into the wallbox pipe sleeve 22. The element 12 is coupled to the swivel tube 34 by a rear coupling member 36 which is described in greater detail below. Element 12 extends axially through the wallbox pipe sleeve 22 and into and through the boiler 13. The boiler, wallbox and blower head are shown schematically only to illustrate a typical environment of the element 12. The particular structure of these items is not essential to the present invention and can vary from that shown.

The element 12 is constructed of one or more individual ceramic composite segments 38 coupled together by ceramic composite coupling members 40. The distal end 42 of the element 12 is closed. A plurality of nozzles 44 in the element 12 project jets of the blowing medium radially outward from the element for impingement upon the interior surfaces of the boiler 13.

The segments 38 consist of a filament wound ceramic preform that has been densified using a sol-gel process. Manufacture of the preform using the filament winding process is shown schematically in FIG. 2. The segments are formed by winding a ceramic fiber about a mandrel 46 using a standard filament winding machine. The mandrel 46 has a generally cylindrical body 48 which is mounted to the winding table through pair of spindles 50 at each end of the mandrel. The length of the mandrel can vary depending upon the desired length of the segment, but is contemplated to be between three and sixteen feet in length.

The mandrel 46 includes a tapered end portion 52 used to taper the distal end of the last or distal segment where the end closure 42 is positioned. The mandrel used to form segments 38 other than the distal tube does not include the tapered end portion 52. The inside diameter of the ceramic segments will depend upon the length of the sootblower and the desired flow rate of the blowing medium.

The ceramic fiber 54, which is supplied on spools 56, is wound upon the mandrel by rotating the mandrel about its axis as the fiber travels through roller guide 66 that is moved back and forth axially, as shown by the arrows 68. Any helical pattern of the filament around the mandrel can be obtained by coordinating the rotational position of the mandrel with the position of the roller guide 66. The 45° helical pattern shown is a preferred pattern, as this will provide the segments 38 with maximum torsional strength. Other angles can be used depending upon the desired strength characteristics of the segments.

The ceramic fiber used for filament winding, known as a tow, consists of 200 to 3000 individual ceramic filaments. Each filament typically has a diameter ranging between 10 and 20 microns, however, filaments having diameters outside this range may also be used. A number of ceramic fibers having a wide variety in composition exist, however, the applicants have found that alumina-based fibers are preferred for the corrosive and high-temperature environments present in boilers. For example, composites comprised of a high-purity alumina fiber (>99% alumina) manufactured by Mitsui Mining Company, Ltd. or an 80% alumina - 20% zirconia fiber (PRD-166) manufactured by DuPont, coupled with an alumina matrix, have been shown to be resistant to the corrosive species found in boilers. Such composites typically have flexural strengths of greater than 50,000 psi at room temperature and greater than 25,000 psi at 1100° C. Furthermore, nonbrittle failure behavior is generally observed. These attributes make continuous fiber ceramic composite elements desirable for use in sootblowers.

Upon completion of the winding operation, the matrix material is incorporated within the preform using a sol-gel process. In the sol-gel process, preform densification is accomplished using a cyclic process that involves impregnation, drying and firing steps.

In the impregnation step, a sol having the desired composition is forced under one atmosphere of pressure into the fibrous preform to fill the void space between the fibers. The preform is then dried at 600° F. and impregnated again. The impregnation and drying steps are repeated until the preform no longer absorbs a significant amount of sol, at which point the preform is fired at 1150° C. to drive off the volatiles and densify the preform. The impregnation, drying and firing cycles are repeated until the porosity of the preform has been reduced to approximately 25 to 35 percent. The number of impregnation steps and firing cycles required to achieve the desired properties is specific to the ceramic fiber and impregnation sol characteristics.

Although almost any ceramic material that can be formulated into a stable sol can be used to produce the matrix within a fiber preform, the inventors have determined that alumina and zirconia sols provide for composites having the most desirable properties. The preferred characteristics of a sol are mean particle size less than 100 nanometers, a solids concentration greater than 5 weight percent, and a viscosity sufficiently low to allow sol penetration into the porosity of the preform. Sols made by Nyacol Products, Inc., (Nyacol AL 20; alumina and $ZrO_2$ (Acetate Stabilized); zirconia) have been shown to yield satisfactory matrices. In addition, sols that produce mullite and yttrium aluminum garnet matrices may also be utilized. Furthermore, it is possible to produce the ceramic matrix using methods other than the sol gel process herein described. For example, impregnation of the preform with chemical precursors, followed by a pyrolysis step may be used to form a dense matrix phase.

The finished composite tube has excellent thermal stability and mechanical properties. Typical tensile strengths are 50,000 to 60,000 psi, and unlike most ceramic materials which fail catastrophically, the composites fail in a nonbrittle manner. The ceramic composites can also be easily machined to meet required assembly tolerances.

An entire sootblower element 12 may extend over 30 feet in length, however, handling of filament wound, unimpregnated fibrous preforms of this length would be extremely difficult due to their low strength. For this reason, shorter segments, ranging in length from 3 to 16 feet in length, are joined together to make an entire element as shown in FIG. 3. Joining is accomplished by telescopicly inserting ends of individual segments 38 into a coupling member 40. A layer 80 of ceramic-to-ceramic cement is disposed between the coupling member and the segments to ensure joint integrity and to provide a seal to prevent leakage of the blowing medium at the joint. Lastly, a plurality of ceramic pins 78 are inserted through holes drilled in the coupling member 40 and the segments 38, and are cemented in place. Cements such as Aremco's Ceramabond 503 or Cotronics' 903 HP are suitable ceramic-to-ceramic cements.

As an alternate embodiment, a coupling member 41 may be telescopicly inserted into the elements as shown in FIG. 4. In this case, the outer diameter of the coupling member is slightly smaller than the inside diameter of the segments. Again, cement 80 and pins 78 are used to affect the required joint/seal.

The coupling member 40 is made in a fashion similar to that of the segment 38, i.e., using a filament winding and sol-gel impregnation process. The fiber direction is also oriented 45° from the axial direction to optimally resist torsional loads.

The chemical composition of the element is resistant to the corrosive species found in a boiler, however, the surface area resulting from the porosity of the element is conducive to corrosion. For this reason, an element may be coated with a material to seal the surface and thus enhance corrosion resistance. Coatings may be applied through a sol-gel process, chemical vapor deposition, thermal spraying, or plasma spraying. Preferred characteristics of a coating are good adherence to the element, a density greater than 90%, and a composition that is both corrosion resistant and chemically compatible with the element. The chemical compositions of the element matrix previously discussed are desirable, e.g., alumina or zirconia.

The element 1 is coupled to the swivel tube 34 of the sootblower by joining the proximal end of the element 12 to the swivel tube through the rear metallic coupling 36 shown in detail in FIG. 5. The rear coupling member 36 is a metallic member that is threaded onto the swivel tube 34 and welded at 37. A ceramic-to-metal cement 84 is used to join and seal the element to the coupling member 36. Aremco's 552 cement is a suitable cement.

A plurality of metallic pins 82 also join the coupling member 36 to the element 12. The metallic pins are spot welded to the coupling member 36 for additional support.

FIG. 6 illustrates the distal end of the element 12 where the distal segment 38 includes a taper portion 86 formed over the taper portion 52 of mandrel 46. The distal end is closed to prevent escape of the blowing medium. Closure can be accomplished using a number of methods. For example, a cap 87 can be bonded to the end using the ceramic-to-ceramic cement 80. The cap can be a composite, castable or monolithic ceramic. A ceramic plug cemented into the end of the element will also work. A plurality of ceramic pins can be used to ensure that the cap or plug is securely held to the element. Alternatively, the end can be sealed using a ceramic sealant, e.g., Cotronics' high temperature ceramic putty. The hole remaining in the distal end after filament winding can also be sealed by stuffing ceramic fiber into it, then packing refractory castable against the fiber from the inside of the tube. A suitable castable for the end closure is Thermal Ceramics Kaocrete 32-CM.

Nozzles 44 are formed as shown in FIG. 7 and 8. With reference to FIG. 7, nozzle 44 is formed by first drilling a hole 90 into the segment 38 and then positioning a nozzle body 92 in the interior of the tube. The nozzle body includes a first larger diameter portion 94 and a second reduced diameter portion 96 forming a shoulder 98 therebetween. The second portion 96 is of a small enough diameter to fit within the aperture 90 such that the shoulder 98 serves to prevent the nozzle body 92 from being forced from the element by the blowing medium. Nozzle body 92 includes a central passageway 100 through which the blowing medium is ejected, forming a jet for impingement against the boiler surfaces. The entry portion 102 of the passageway is flared to provide a smooth transition for the blowing medium to flow into the passageway 100 to produce a laminar jet stream. The passageway generally diverges toward the outlet end enabling a jet stream to expand slightly to increase the cross-sectional area of impingement of the jet stream.

Nozzle body 92 may be a partially or a fully densified monolithic ceramic that is cemented to the inner surface of the segment 38 by the ceramic-to-ceramic adhesive 80. Both types of nozzle bodies 92 may be cemented to the inner surface of the segment 38 before the segment is completely densified. In this event, during the final impregnation steps of the sol-gel process, the segment and a partially densified nozzle body will be further densified. In addition to the ceramic-to-ceramic cement 80, the sol itself will serve to bond the nozzle body 92 to the segment 38. Cements that have been shown to satisfactorily bond nozzle bodies to the segment wall are Aremco's Ceramabond 503 and Cotronics 903HP.

An alternative embodiment of the nozzle body is shown in FIG. 8 in which the nozzle body 104 is inserted into the segment 38 from the outside. In this case, the outer diameter of the nozzle 104 is slightly smaller than the hole in the segment. As in the above embodiment, the nozzle body may be fabricated from partially or fully densified ceramics. Alternatively, the nozzle body 104 can be a ceramic composite fabricated using the filament winding and sol-gel processes. The nozzle body 104, like nozzle body 92, includes an internal passageway 106 forming the jet of the blowing medium. The passageway 106 has a flared entry portion 108 and then diverges toward the outlet to expand the area of impingement of the jet stream. The ceramic-to-ceramic adhesive 80 may be used to mount a partially dense nozzle body 104 in place before the tube is fully densified. The final densification stages of the sol-gel process will serve to further bond the nozzle into the segment 38.

As an alternative embodiment for joining the fully dense nozzle bodies 92, 104 to the segment 38, the nozzles may be bonded to the segment after the preform has been fully densified in the sol-gel process. Again, ceramic-to-ceramic cements 80 can be used to affect bonding; however, a firing cycle may be required to fully cure the cement.

FIG. 9 illustrates the mandrel 10 used to wind the filament for a composite nozzle body 104. Once the nozzle body has been formed, it is cut along the centerline 112 forming two nozzle bodies. The flared entry portion 108 of the passageway is machined into the passageway before the nozzle is fully densified.

The element 12 is entirely manufactured of ceramic material such that it can withstand higher temperatures and more corrosive environments than the currently used metallic sootblower element. As a result, the sootblower element of the present invention can be permanently installed within a boiler and eliminate the need for retracting mechanism for the element and also eliminates the need for external space surrounding the boiler for the element in the retracted position. Accordingly, the object of the present invention has been met.

While the invention has been shown and described in the context of a sootblower element, the composite ceramic elements can be used in any application requiring fluid flow through a conduit in a high temperature or corrosive environment. Examples of other applications include the tubes forming the boiler wall and tubes used in a heat exchanger within the boiler.

Although the invention presented herein has been directed at the use of continuous fiber ceramic composites for sootblower elements, other types of ceramics may be suitable. In particular, ceramics reinforced by whiskers, particles or chopped fiber may have adequate properties and corrosion resistance.

It is to be understood that the invention is not limited to the exact construction or method illustrated and described above, but that various changes and modifications may be made without departing from the spirit and scope of the invention as defined in the following claims.

We claim:

1. A sootblower element for placement within a boiler to deliver a blowing medium to the internal surfaces of the boiler to clean the surfaces, comprising:
   at least one elongated cylindrical ceramic segment having an axially extending bore therethrough for passage of a blowing medium through said element and at least one radial opening through said segment for discharge of a radially directed stream of the blowing medium from said segment, said segment being joined to a blowerhead of a sootblower at a proximal end of said segment and extending from said proximal end into the boiler;
   a closure means at a distal end of said element for closing said bore; and
   means for mounting said element to a sootblower at said proximal end of said segment.

2. The element of claim 1 wherein said segment is made of a ceramic composite having a ceramic fiber within a ceramic matrix.

3. The element of claim 2 wherein said ceramic composite includes a filament wound ceramic fiber within a ceramic matrix.

4. The element of claim 2 wherein said fiber is alumina based.

5. The element of claim 2 wherein said fiber is at least 80 percent alumina.

6. The element of claim 5 wherein said fiber is at least 99 percent alumina.

7. The element of claim 2 wherein said matrix is selected from the group of alumina, zirconia, mullite, aluminum silicate oxide and yttrium aluminum garnet.

8. The element of claim 2 wherein said fiber is oriented to maximize the strength of said segment in the direction of anticipated loading.

9. The element of claim 2 wherein said fiber is circumferentially wound at approximately a 45° angle to the longitudinal axis of said cylindrical ceramic segment.

10. The element of claim 1 further comprising a nozzle member disposed within said radial opening of said segment forming a flow passage coaxial with said radial opening through said cylindrical ceramic segment for discharge of blowing the medium in a radially directed stream.

11. The element of claim 1 wherein said means for mounting said element to a sootblower includes:
   a cylindrical metallic member coupled to the sootblower and having a bore for reception of the proximal end of said segment therein, the proximal end of said segment being inserted into said metallic mounting member; and
   a ceramic to metal adhesive between said segment and said metallic member to join and seal said ceramic segment and metallic member together.

12. The element of claim 11 further comprising at least one metallic pin extending radially through the wall of said segment and said metallic member.

13. The element of claim 1 further comprising:
   a plurality of said cylindrical ceramic segments arranged in an end-to-end abutting relationship to form said element having a length equal to the sum of the lengths of said plurality of said segments;
   cylindrical coupling members of ceramic for coupling said segments to one another, said coupling members each having an axial bore of a diameter sufficient to receive end portions of said cylindrical ceramic segments therein with one segment being inserted into said coupling ember from one end and another segment being inserted into said coupling member through the opposite end of said coupling member; and
   a ceramic to ceramic adhesive between said segments and said coupling members for securing each of said segments to said coupling members.

14. The element of claim 1 further comprising:
   a plurality of said cylindrical ceramic segments arranged in an end-to-end butting relationship to form said element having a length equal to the sum of the lengths of said plurality of said segments;
   cylindrical coupling members of ceramic for coupling said segments to one another, said coupling members each having an internal bore and an outside diameter of a size to fit within said cylindrical ceramic segments wherein one segment is telescoped over said coupling member from one end and another segment is telescoped over said coupling member from the opposite end of said coupling member to engage adjacent segments in end-to-end abutting relation; and a ceramic-to-ceramic adhesive between said segments and said coupling members for securing each of said segments to said coupling members.

15. The element of claim 14 further comprising at least one ceramic pin extending radially through each coupling member and the wall of one of said segments.

16. The element of claim 14 wherein said coupling member is a composite ceramic having a continuous ceramic fiber in a ceramic matrix.

17. The element of claim 16 wherein the fiber of said coupling member is circumferentially wound at a 45° angle to the axis of said coupling member.

18. The element of claim 13 further comprising at least one ceramic pin extending radially through each coupling member and the wall of one of said segments.

19. The element of claim 13 wherein said coupling means is a composite ceramic having a continuous ceramic fiber in a ceramic matrix.

20. The element of claim 19 wherein the fiber of said coupling member is circumferentially wound at a 45° angle to the axis of said coupling member.

21. The element of claim 1 further comprising a coating to seal the surface of said element to protect said element in the boiler environment by reducing the surface porosity.

22. The element of claim 21 wherein said coating is a ceramic.

23. The element of claim 21 wherein said coating is selected from the group of alumina, zirconia, mullite, aluminum silicate oxide and yttrium aluminum garnet.

24. The element of claim 1 further comprising a tapered portion adjacent the distal end of said element to reduce the diameter of said bore at the distal end.

25. The element of claim 1 wherein said closure means includes a ceramic cap secured to said element at the distal end thereof to close said axially extending bore; and a ceramic to ceramic adhesive to seal said cap to said element.

26. The element of claim 25 further comprising at least one ceramic pin extending radially through said segment and into said cap.

27. The element of claim 1 wherein said closure means includes a plug of ceramic fibers packed in a ceramic castable.

28. A nozzle for a ceramic sootblower element for placement within a boiler to deliver a blowing medium to the internal surfaces of the boiler, said element having an axial bore for passage of the blowing medium and a radial opening through the element wall, said nozzle comprising:

a ceramic body disposed within said radial opening having a bore therethrough coaxial with said radial opening in said element; and ceramic-to-ceramic adhesive to bond said body to said element.

29. The nozzle of claim 28 wherein said body is a ceramic composite having a ceramic fiber within a ceramic matrix.

30. The nozzle of claim 29 wherein said ceramic fiber is filament wound.

31. The nozzle of claim 28 wherein said body has a first axial portion with an outside diameter sized to fit within the radial opening of said tube and a second axial portion disposed within said element bore having an outside diameter larger than the outside diameter of said first portion forming a shoulder between said first and second axial portions of said body with at least a portion of said shoulder engaging the inner surface of said element.

* * * * *

UNITED STATES PATENT AND TRADEMARK OFFICE
CERTIFICATE OF CORRECTION

PATENT NO. : 5,230,306
DATED : July 27, 1993
INVENTOR(S) : Eric A. Barringer, et al.

It is certified that error appears in the above-identified patent and that said Letters Patent is hereby corrected as shown below:

Column 5, Line 61, after "element" delete "1" and insert --12--.

Column 8, Line 49, Claim 13, after "coupling" delete "ember" and insert --member--.

Signed and Sealed this

Twenty-ninth Day of March, 1994

Attest:

BRUCE LEHMAN

Attesting Officer     Commissioner of Patents and Trademarks